Patented Mar. 27, 1923.

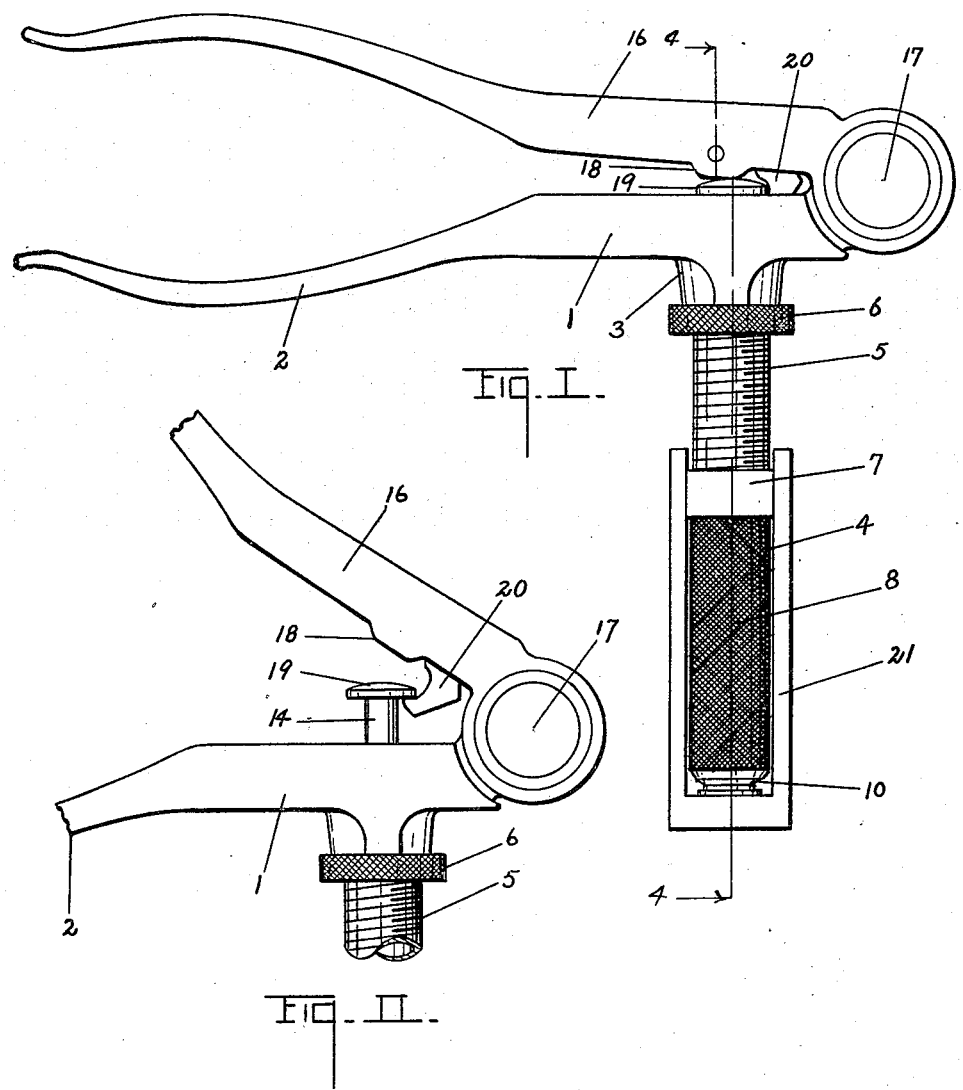

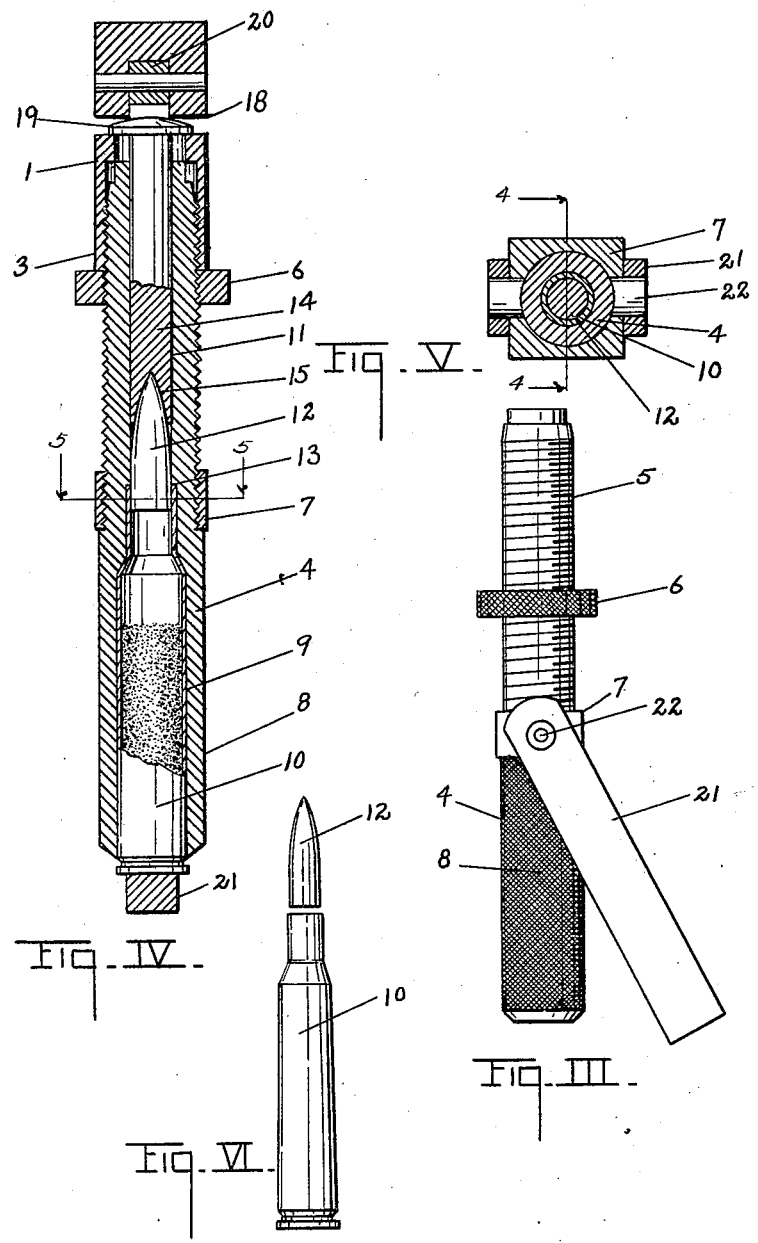

1,449,775

UNITED STATES PATENT OFFICE.

ADOLPH OTTO NIEDNER, OF DOWAGIAC, MICHIGAN, ASSIGNOR TO NIEDNER RIFLE BARREL CO., OF DOWAGIAC, MICHIGAN.

SHELL-LOADING TOOL.

Application filed May 5, 1921. Serial No. 466,937.

*To all whom it may concern:*

Be it known that I, ADOLPH OTTO NIEDNER, a citizen of the United States, residing at Dowagiac, county of Cass, State of Michigan, have invented certain new and useful Improvements in Shell-Loading Tools, of which the following is a specification.

This invention relates to improvements in shell loading tools.

The main objects of this invention are:

First, to provide an improved tool adapted for the loading of shells which enables the setting of the bullet in a very accurate manner.

Second, to provide an improved tool for the loading of shells which is capable of very rapid manipulation and may be readily adapted for the loading of shells of different size and shape.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side view of my improved shell loading tool.

Fig. II is a detail side view with the actuating lever partially open.

Fig. III is a side view of the shell holder with the thrust member swung out to permit the insertion or removal of a shell.

Fig. IV is a detail view mainly in section on a line corresponding to line 4—4 of Figs. I and V.

Fig. V is a detail view mainly in section on a line corresponding to line 5—5 of Fig. IV.

Fig. VI is a side view of a shell and the bullet.

In the drawing similar reference characters refer to similar parts throughout the several views, and the sectional views are taken looking in the direction of the little arrows at the ends of the section lines.

Referring to the drawing, in the embodiment illustrated the body member 1 is provided with a handle extension 2 and with a socket 3 internally threaded to receive the shell holder 4. The inner portion of this shell holder is threaded at 5, not only to enable its being screwed into the socket, but to receive the lock nut 6 and the thrust member supporting collar 7.

The shell holder is knurled at 8 to provide a grip permitting its being screwed into and removed from the socket, it being the intent or purpose to provide a shell holder for each size and shape of shell which it is desired to load, that is, each tool will be provided with a series of shell holders or the shell holders will be formed to be interchangeably used with the tool, so that each user may be equipped as desired without the necessity of having a separate tool for each shell.

The shell holder is provided with a shell chamber 9 at its outer end of such size and shape that the shell 10 fits closely therein. The holder is also provided with a plunger cylinder and bullet holder 11, this cylinder being of such diameter that the bullet 12 is a sliding fit therein. At the inner end of the shell chamber is a shoulder 13 corresponding to the thickness of the wall of the shell, so that the bullet 12, being, as stated, a sliding fit within the cylinder, is accurately guided thereby into the shell as shown in Fig. IV.

The plunger 14 is provided with a recess 15 fitting the tip of the bullet. The plunger being a sliding fit within the cylinder, there is no lateral thrust upon the bullet and the result is that the bullet is seated or forced into the shell in perfect alinement. The depth of seating the bullet may be controlled by the adjustment of the holder in the socket, that is, the deeper the holder is threaded into the socket the deeper the bullet will be seated in the shell and vice versa. The lock nut 6 securely holds the shell holder in its adjusted position.

The plunger is actuated by means of the lever 16 which is pivoted at 17 and is provided with a cam-like projection 18 engaging the rounded head 19 of the plunger. A dog 20 is pivoted within the lever 16 to engage the head of the plunger, as shown in Fig. II, on the retracting or opening movement of the lever, thereby retracting the plunger.

The shell is supported within the holder by means of the yoke-like thrust member 21 which is mounted on the collar 7 by means of the pivots 22. The thrust member may be swung over the end of the holder and, by turning the collar 7, the thrust member is clamped upon the end of the shell forcing it "home" in the chamber and sustaining the thrust when the bullet is forced into the shell. The thrust member may be quickly released by rotating the collar and swung to one side.

I have illustrated and described my improvements in an embodiment which I find very practical. I have not attempted to illustrate or describe certain modifications and structural details, which I contemplate as I believe the disclosure made will enable those skilled in the art to which my invention relates to embody or adapt the same as may be desired.

Having thus described my invention, what I claim as new and desire to secure by Letters Patent, is:

1. In a shell loading tool, the combination of a body member provided with a handle and with a shell holder socket on its outer side, a shell holder threaded into said socket and having a shell chamber at its outer end conformed so that the shell to be loaded fits therein, and a bullet holder and plunger cylinder at its inner end, there being a shoulder at the inner end of the shell chamber corresponding to the thickness of the wall of the shell, the diameter of the bullet holder and cylinder being such that the bullet is a sliding fit therein, a collar threaded upon said shell holder for adjustment thereon, a thrust yoke pivoted upon said collar to swing over the end of the holder to support a shell therein, said yoke being adjusted to the shell by the rotation of the collar, a plunger having a recess in its inner end adapted to receive the tip of the bullet, and a lever pivoted upon said body member to coact with said plunger, said lever being provided with a pivoted dog adapted to engage the plunger for retracting it when the lever is swung to its open position.

2. In a shell loading tool, the combination of a body member provided with a handle, a shell holder mounted on said body member and having a shell chamber at its outer end conformed so that the shell to be loaded fits therein, and a bullet holder and plunger cylinder at its inner end, there being a shoulder at the inner end of the shell chamber corresponding to the thickness of the wall of the shell, the diameter of the bullet holder and cylinder being such that the bullet is a sliding fit therein, a collar threaded upon said holder for adjustment thereon, a thrust yoke pivoted upon said collar to swing over the end of the holder to support a shell therein, said yoke being adjusted to the shell by the rotation of the collar, a plunger having a recess in its inner end adapted to receive the tip of the bullet, and a lever pivoted upon said body member to coact with said plunger.

3. In a shell loading tool, the combination of a shell holder having a shell chamber at its outer end conformed so that the shell to be loaded fits therein, and a bullet holder and plunger cylinder at its inner end, there being a shoulder at the inner end of the shell chamber corresponding to the thickness of the wall of the shell, the diameter of the bullet holder and cylinder being such that the bullet is a sliding fit therein, a collar threaded upon said shell holder for adjustment thereon, a thrust yoke pivoted upon said collar to swing over the end of the holder to support a shell therein, said yoke being adjusted to the shell by the rotation of the collar, a plunger having a recess in its inner end adapted to receive the tip of the bullet; and means for actuating said plunger.

4. In a shell loading tool, the combination of a body member provided with a handle, a shell holder removably mounted in said socket and having a shell chamber and a bullet holder and plunger cylinder, a collar threaded upon said shell holder for adjustment thereon, a thrust member pivoted upon said collar to support a shell within the holder, said thrust member being adjusted to the shell by the rotation of the collar, a plunger adapted to engage the bullet, and a lever pivoted upon said body member to coact with said plunger, said lever being provided with a pivoted dog adapted to engage the plunger for retracting it when the lever is swung to open position.

5. In a shell loading tool, the combination of a shell holder having a shell chamber and a bullet holder and plunger cylinder, a collar threaded upon said shell holder for adjustment thereon, a thrust member mounted upon said collar to support a shell within the holder, said thrust member being adjusted to the shell by the rotation of the collar, and a plunger adapted to engage the bullet.

6. In a shell loading tool, the combination of a body member provided with a handle and with a shell holder socket, a shell holder threaded into said socket for adjustment therein, a lock nut on said shell holder whereby it is secured upon the body member in its adjusted positions, said shell holder being provided with a shell chamber at its outer end and a bullet holder and plunger cylinder at its inner end, a plunger, and means for actuating said plunger.

7. In a shell loading tool, the combination with a body member provided with a handle and with a shell holder socket on its outer side, a shell holder threaded into said socket and having a shell chamber at its outer end conformed so that the shell to be loaded fits therein and a bullet holder and cylinder at its inner end axially aligned with said shell chamber, there being a shoulder at the inner end of the shell chamber corresponding to the thickness of the wall of the shell, a plunger reciprocating in said cylinder and having a recess at its inner end adapted to receive the tip of the bullet, and a lever pivoted on said body member to engage the end of said plunger, said lever being provided with a pivoted dog adapted to engage the plunger for retracting it when the lever is swung to its open position, the diameter of the said bullet holder and cylinder being such that the bullet is a sliding fit and is guided therein and of such length that the plunger is a sliding fit and is supported against lateral movement therein whereby the seating thrust upon the bullet is axial and the bullet is squarely seated within the shell.

8. In a shell loading tool, the combination with a body member provided with a handle and with a shell holder socket on its outer side, a shell holder threaded into said socket and having a shell chamber at its outer end conformed so that the shell to be loaded fits therein and a bullet holder and cylinder at its inner end axially aligned with said shell chamber, there being a shoulder at the inner end of the shell chamber corresponding to the thickness of the wall of the shell, a plunger reciprocating in said cylinder, and a lever pivoted on said body member to engage the end of said plunger, the diameter of the said bullet holder and cylinder being such that the bullet is a sliding fit and is guided therein and of such length that the plunger is a sliding fit and is supported against lateral movement therein whereby the seating thrust upon the bullet is axial and the bullet is squarely seated within the shell.

9. In a shell loading tool, the combination of a body member provided with a handle, a shell holder mounted on said body member and provided with a shell chamber at its outer end and a bullet holder and plunger cylinder at its inner end axially centered with said shell chamber, a plunger having a head with a rounded face, and a lever pivoted on said body member and having a flat surfaced portion thereon coacting with said rounded face, said plunger being a sliding fit in said cylinder and the cylinder being of such length as to guide the plunger axially thereby seating the bullet squarely within the shell.

10. In a shell loading tool, the combination of a body member provided with a handle, a shell holder mounted on said body member and provided with a shell chamber at its outer end and a bullet holder and plunger cylinder at its inner end axially centered with said shell chamber, a plunger, and a lever pivoted on said body member to engage the projecting end of said plunger, said plunger being a sliding fit in said cylinder and the cylinder being of such length as to guide the plunger axially seating the bullet squarely within the shell.

In witness whereof, I have hereunto set my hand and seal in the presence of two witnesses.

ADOLPH OTTO NIEDNER. [L. S.]

Witnesses:
 L. J. WOOSTER,
 R. EUGENE MORSE.